(12) United States Patent
Ohtsuka (10) Patent No.: US 8,897,462 B2
(45) Date of Patent: Nov. 25, 2014

(54) AUDIO PROCESSING APPARATUS, SOUND PICKUP APPARATUS AND IMAGING APPARATUS

(75) Inventor: Yoshio Ohtsuka, Osaka (JP)

(73) Assignee: Panasonic Corporation, Osaka (JP)

(*) Notice: Subject to any disclaimer, the term of this patent is extended or adjusted under 35 U.S.C. 154(b) by 435 days.

(21) Appl. No.: 13/300,967

(22) Filed: Nov. 21, 2011

(65) Prior Publication Data

US 2012/0127342 A1  May 24, 2012

(30) Foreign Application Priority Data

Nov. 22, 2010 (JP) .................................. 2010-259748

(51) Int. Cl.
```
H03G 5/00       (2006.01)
H04N 5/77       (2006.01)
G10L 21/0208    (2013.01)
G11B 20/10      (2006.01)
H04N 9/806      (2006.01)
H04R 3/00       (2006.01)
G10L 21/0364    (2013.01)
H04R 3/04       (2006.01)
```
(52) U.S. Cl.
CPC ............ *H04N 5/772* (2013.01); *G10L 21/0208* (2013.01); *G11B 20/10527* (2013.01); *H04N 9/806* (2013.01); *G10L 21/0364* (2013.01); *G11B 2020/10564* (2013.01); *H04R 3/04* (2013.01); *H04R 2410/03* (2013.01); *H04R 2499/11* (2013.01)
USPC .............................................. 381/98; 381/92

(58) Field of Classification Search
CPC .......... H03G 3/32; H03G 5/005; H04S 7/301; H04R 25/505; H04R 25/453
USPC ......... 381/312, 317, 320, 321, 328, 330, 122, 381/92, 98, 101–103, 2; 348/231.4
See application file for complete search history.

(56) References Cited

U.S. PATENT DOCUMENTS 4,750,207 A * 6/1988 Gebert et al. ................. 381/317
5,550,925 A * 8/1996 Hori et al. ....................... 381/98

FOREIGN PATENT DOCUMENTS

| JP | 59-77710 | 5/1984 |
| JP | 1-181209 | 7/1989 |
| JP | 4-119708 | 4/1992 |
| JP | 4-363996 | 12/1992 |
| JP | 5-266404 | 10/1993 |
| JP | 7-44881 | 11/1995 |
| JP | 9-46268 | 2/1997 |

* cited by examiner

*Primary Examiner* — Paul S Kim
*Assistant Examiner* — Ammar Hamid
(74) *Attorney, Agent, or Firm* — Panasonic Patent Center (57) ABSTRACT

A sound processing apparatus includes a sound input unit configured to input a sound signal, a signal processor having a band-limiting filter for limiting a passing band of the sound signal, and being configured to apply a predetermined signal processing on a sound signal output from the band-limiting filter, and a controller configured to control a band width of the passing band of the band-limiting filter. The controller changes the band width of the passing band according to a level of the sound signal, and makes a speed at the time of expanding the band width faster than a speed at the time of narrowing the band width.

6 Claims, 9 Drawing Sheets

AUDIO PROCESSING APPARATUS, SOUND PICKUP APPARATUS AND IMAGING APPARATUS

BACKGROUND

1. Technical Field

The technical field relates to an audio processing apparatus for processing an input sound, a sound pickup apparatus and an imaging apparatus having the audio processing apparatus.

2. Related Art

In recent years, a digital camera that can record not only a still image but also a moving image is spreading. At the time of recording a moving image, a sound as well as an image should be recorded, and thus a microphone for collecting sounds is provided to such a digital camera. A digital camera tends to be miniaturized, which causes a microphone for collecting sounds to be also miniaturized. The miniaturization of the microphone deteriorates sensitivity of the microphone, thereby reducing an S/N ratio.

A sound processing apparatus for executing various filter processes in order to improve a S/N ratio with respect to a sound signal is generally known. For example, JP04-119708A discloses a configuration which increases attenuation in a low frequency region when an input signal is small, and decreases attenuation in a low frequency region when the input signal is large, to result in a flat frequency characteristic. According to the audio processing apparatus described in JP04-119708A, a gain in a frequency region determined by a characteristic of a filter circuit changes according to a change in an input signal even at a signal level of which temporal variation is great, so that noises can be repressed without causing a time delay.

In a technique of JP04-119708A, a passing band characteristic of a filter is changed according to an input signal level. However, a user occasionally feels a sense of discomfort in audibility depending on a way of changing a passing band characteristic.

To solve the above problem, an audio processing apparatus is provided that can reduce a user's sense of discomfort in audibility and can simultaneously improve an S/N ratio of an input sound signal, and a sound pickup apparatus and an imaging apparatus having the voice processing apparatus are also provided.

SUMMARY

In a first aspect, a sound processing apparatus is provided that includes a sound input unit configured to input a sound signal, a signal processor having a band-limiting filter operable to limit a passing band of the sound signal input by the sound input unit, the signal processor being configured to apply a predetermined signal processing on a sound signal output from the band-limiting filter, and a controller configured to control a band width of the passing band of the band-limiting filter. The controller changes the band width of the passing band of the band-limiting filter according to a level of the sound signal input by the sound input unit, and makes a speed of changing the band width faster when expanding the band width than when narrowing the band width.

In a second aspect, a sound pickup apparatus is provided that includes a sound input unit configured to obtain a sound and generate a sound signal based on the obtained sound, a signal processor having a band-limiting filter operable to limit a passing band of the sound signal generated by the sound input unit, the signal processor being configured to apply a predetermined signal processing on a sound signal output from the band-limiting filter, and a controller configured to control a band width of the passing band of the band-limiting filter. The controller changes the band width of the passing band of the band-limiting filter according to a level of the sound signal generated by the sound input unit, and makes a speed of changing the band width faster than when expanding the band width than when narrowing the band width.

In a third aspect, an imaging apparatus capable of recording a subject image as image data, is provided. The imaging apparatus includes a sound input unit configured to input a sound signal, a signal processor having a band-limiting filter operable to limit a passing band of the sound signal input by the sound input unit, the signal processor being configured to apply a predetermined signal processing on a sound signal output from the band-limiting filter, and a controller configured to control a band width of the passing band of the band-limiting filter. The controller changes the band width of the passing band of the band-limiting filter according to a level of the sound signal input by the sound input unit, and makes a speed of changing the band width faster when expanding the band width than when narrowing the band width.

According to the above aspect, the passing band of the band-limiting filter is changed according to the level of the input signal, so that an S/N ratio can be improved. When the sound level is changed from a low level to a high level, the passing band of the band-limiting filter is quickly expanded, and when the sound level is changed from a high level to a low level, the passing band of the band-limiting filter is slowly narrowed. Controlling the change speed of the passing band in such a manner causes a user's sense of discomfort in audibility to be reduced.

DETAILED DESCRIPTION OF PREFERRED EMBODIMENTS

First Embodiment

A digital camera according to one embodiment described below includes a microphone, and can record sounds picked up by the microphone as well as images at the time of recording moving images.

1. Configuration

A configuration of the digital camera will be described below with reference to the drawings.

1-1. Configuration of Digital Camera

Figure 1:
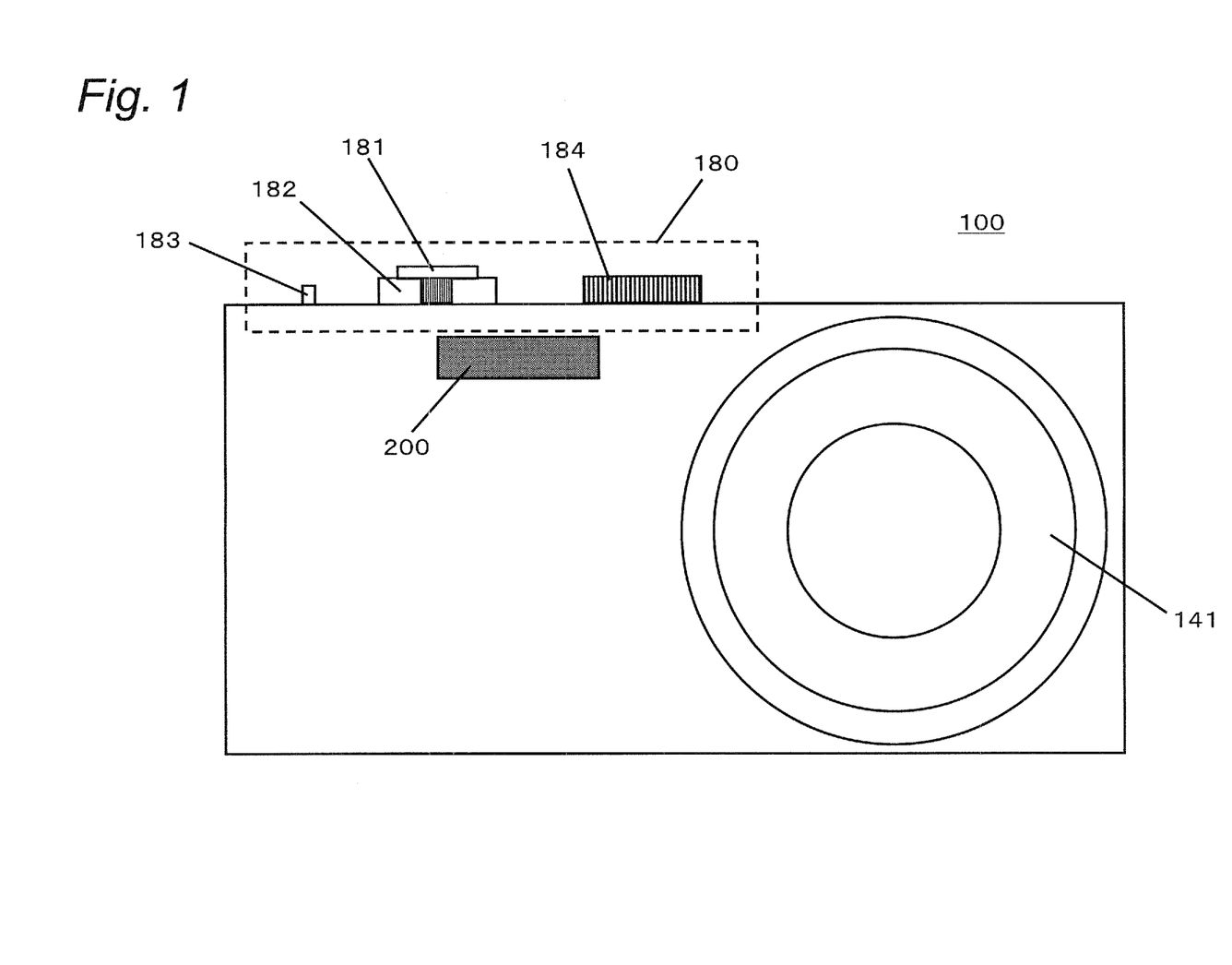
FIG. 1 is a front view illustrating a digital camera according to a first embodiment.

FIG. 1 is a front view of the digital camera 100. The digital camera 100 has a lens barrel 141 and a flashbulb 200 on its front surface. The digital camera 100 has an operation unit 180 including a release button 181, a zoom lever 182, a power button 183, a mode dial 184, and the like on its upper surface.

Figure 2:
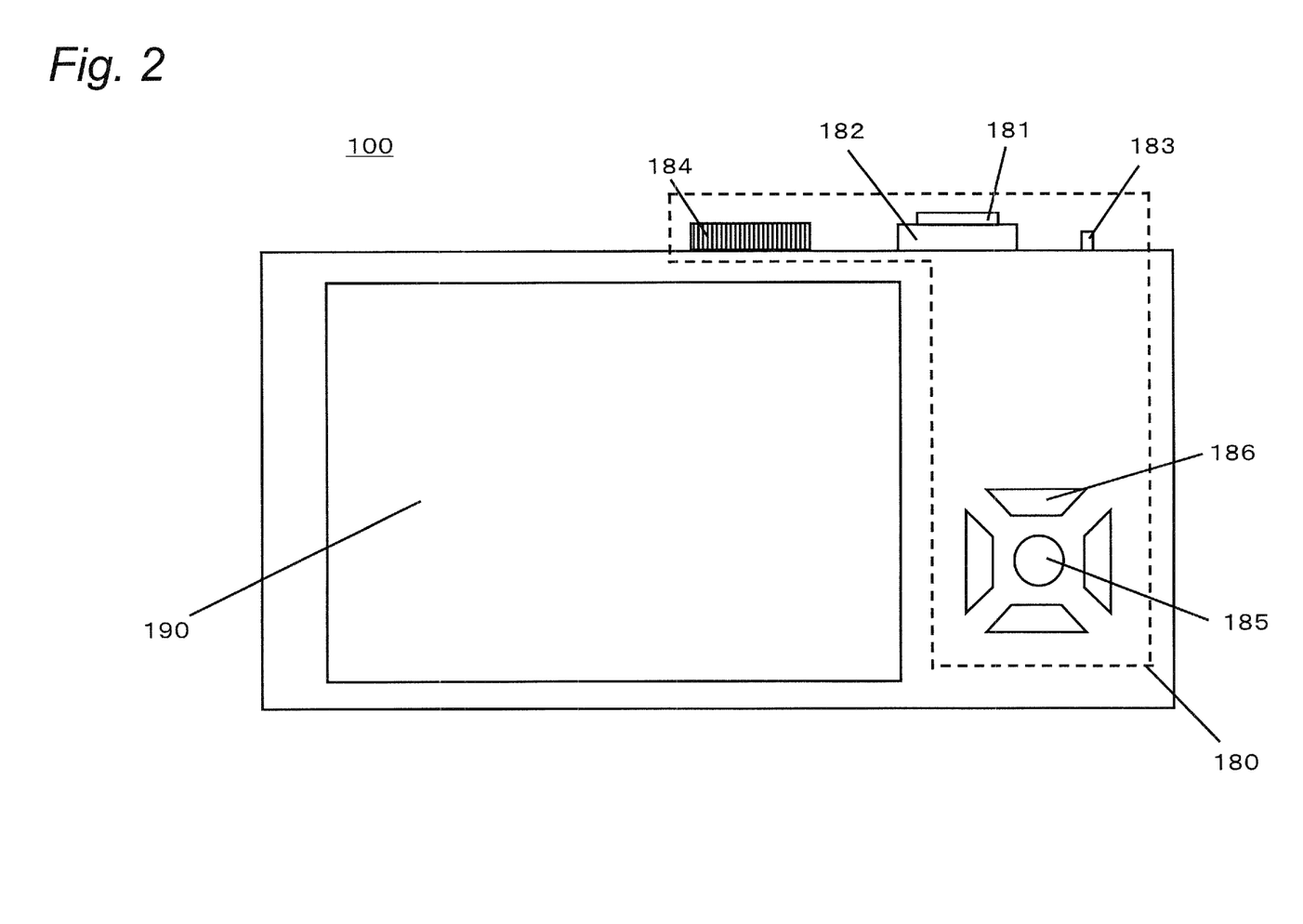
FIG. 2 is a rear view illustrating the digital camera according to the first embodiment.

FIG. 2 is a rear view illustrating the digital camera 100. On a rear surface of the digital camera 100, a center button 185 and a cross button 186 are provided in the operation unit 180.

Figure 3:
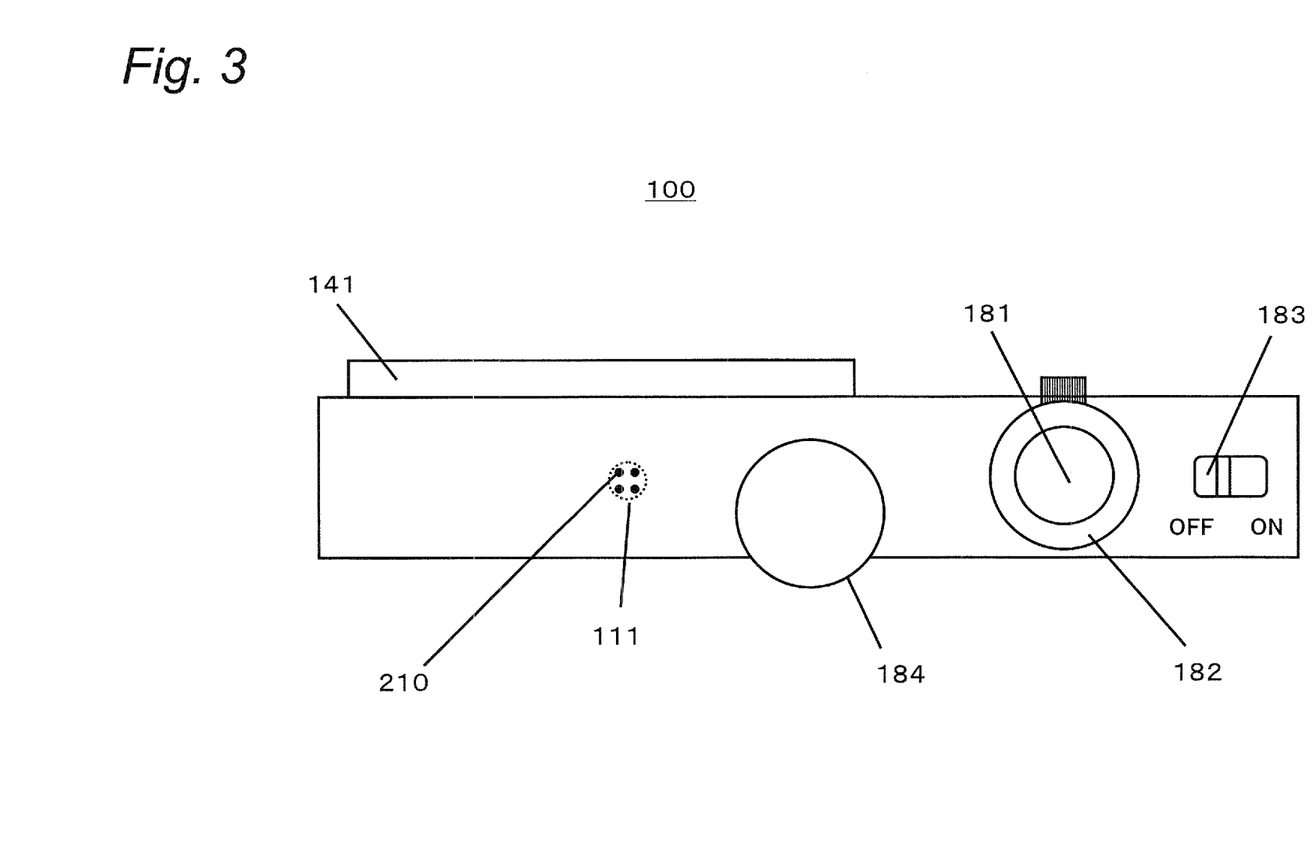
FIG. 3 is a top view illustrating the digital camera according to the first embodiment.

FIG. 3 is a top view illustrating the digital camera 100. The digital camera 100 has microphone holes 210 on its upper surface. A microphone 111 is located under the microphone holes 210.

Figure 4:
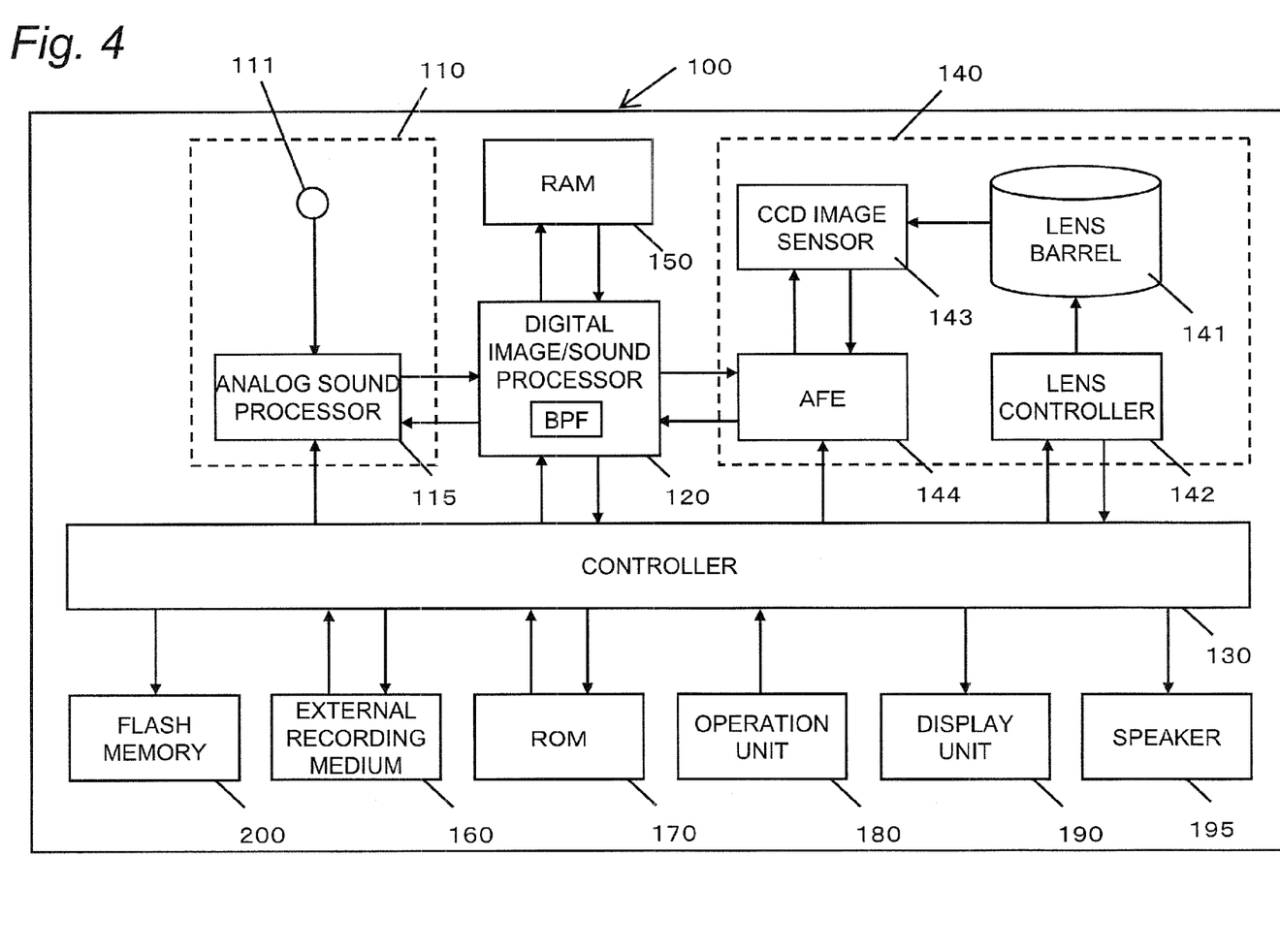
FIG. 4 is a block diagram illustrating an electronic configuration of the digital camera according to the first embodiment.

FIG. 4 is a diagram illustrating an electronic configuration of the digital camera 100. The digital camera 100 generates image information and an audio signal based on information obtained from an outside. The image information is generated by an image input system 140, and the audio signal is generated by a sound input system 110. The generated image information and the sound signal are subjected to A/D-conversion by an AFE 144 and an analog sound processor 115, respectively, and then are fed into a digital image/sound processor 120. The digital image/sound processor 120 executes predetermined processes on the input image signal and sound signal, and records the processed signals as image data and sound data in an external storage medium 160 such as a memory card. The image data recorded in the external storage medium 160 can be reproduced according to a user's operation of the operation unit 180.

The respective elements shown in FIG. 1 to FIG. 4 will be described in detail below.

The image input system 140 includes the lens barrel 141, a lens controller 142, a CCD image sensor 143, and the AFE (Analog Front End) 144.

The lens barrel 141 includes an optical system including a focus lens, a zoom lens and the like, and motors for driving the optical system. The motors are controlled according to a control signal sent from the lens controller 142 to drive the optical system for adjusting a focus and a view angle of a subject, and a quantity of incident light and correcting camera shake, so that a subject image is formed.

The CCD image sensor 143 captures a subject image formed via the lens barrel 141 and generates an image signal. A plurality of photodiodes are arranged in a two-dimensional manner on a light receiving surface of the CCD image sensor 143. Primary-color filters of R, G, B are arranged in a predetermined array structure correspondingly to the respective photodiodes. Light from the subject to be captured passes through the lens barrel 141, and is imaged on the light receiving surface of the CCD image sensor 143. The imaged subject image is converted into color information separated correspondingly to R, G, B according to a quantity of light incident on the respective photodiodes. As a result, an entire image signal representing the subject image is generated. The respective photodiodes are provided corresponding to respective pixels of the CCD image sensor 143. However, color information actually output from each photodiode is primary-color information of either of R, G and B. For this reason, the color output from each pixel is generated based on primary color information (color, a quantity of light) output from a photodiode corresponding to the pixel and peripheral photodiodes around the corresponding photodiode in the digital image/sound processor 120 at a later stage. When the digital camera 100 is in a recording mode, the CCD image sensor 143 can generate an image signal of a new frame every constant time.

The AFE 144 represses noises in the image information read from the CCD image sensor 143 caused by correlated double sampling, amplifies a width of an input range of an A/D converter via an analog gain controller, and performs A/D conversion via an A/D converter. Thereafter, the AFE 144 outputs an image signal to the digital image/sound processor 120.

The sound input system 110 includes the microphone 111 and the analog sound processor 115. The microphone 111 converts a pressure fluctuation caused by an acoustic wave into an electric signal to output it as a sound signal. The analog sound processor 115 executes a predetermined process on the sound signal and performs A/D-conversion on the processed sound signal via the A/D converter to output the AD-converted signal to the digital image/sound processor 120.

The digital image/sound processor 120 executes various processes on the image information output from the AFE 144 and the sound signal output from the analog sound processor 115. For example, the digital image/sound processor 120 executes a gamma correction, a white balance correction, a scratch correction, and an encoding process, on the image information. Further, the digital image/sound processor 120 executes various processes on the sound signal according to instructions from a controller 130. The various processes for the sound signal include a band-pass filter process for passing a signal in a specific frequency band (passing band) set in advance. That is to say, the digital image/sound processor 120 includes a band-pass filter. A passing band for the band-pass filter provided to the digital image/sound processor 120 is set by the controller 130. The digital image/sound processor 120 may be composed of a hard-wired electronic circuit or a microcomputer using a program. The digital image/sound processor 120 may be composed of one semiconductor chip together with the controller 130.

A display unit 190 is arranged on the rear surface of the digital camera 100. The display unit 190 displays an image based on the image information processed by the digital image/sound processor 120. The image to be displayed by the display unit 190 includes a through image and a recorded image. The through image is an image which is displayed by continuously displaying new frames generated by the CCD image sensor 143 every constant time. When the digital camera 100 is set to a recording mode and is in a standby state for a still image recording or a moving image recording or in a moving image recoding state, the digital image/sound processor 120 normally generates the through image based on the image signal generated by the CCD image sensor 143. A user referring to the through image displayed on the display unit 190 can take an image while checking a composition of a subject. The recorded image is an image recorded in the external storage medium 160, and is displayed when the digital camera 100 is in a playback mode. The image recorded in the external storage medium 160 has a larger number of pixels than that of an image which can be displayed on the display unit 190. For this reason, at the time of the display on the display unit 190, the image is reduced to an image with smaller number of pixels. The image information with the large number of pixels which is to be recorded in the external storage medium 160 is generated by the digital image/sound processor 120 based on the image information generated by the CCD image sensor 143, after receiving the user's operation of the release button 181. A speaker 195 outputs the sound signal recorded in the external storage medium 160.

A ROM 170 is a rewritable nonvolatile memory such as a flash memory. The ROM 170 stores programs relating to autofocus control (AF control), automatic exposure control (AE control) and light emission control of the flashbulb 200, and a program for generally controlling an entire operation of the digital camera 100. Further, the ROM 170 stores various settings relating to the digital camera 100. The programs stored in the ROM 170 are executed by the controller 130 in order to generally control the entire operation of the digital camera 100.

The controller 130 may be composed of a hard-wired electronic circuit or a microcomputer. Further, the controller 130 may be formed in a semiconductor chip where the digital image/sound processor 120 is formed. Further, the ROM 170 does not have to be provided outside the controller 130, and may be provided inside the controller 130.

A RAM 150 is a storage device that functions as a work memory of the digital image/sound processor 120 and the controller 130. For example, the RAM 150 can be composed of an SDRAM or a flash memory. The RAM 150 functions as an internal memory for recording image information and a sound signal.

The external storage medium 160 is an external memory having a storage element such as a flash memory inside, such as, for example, an SD card or an USB memory. The external storage medium 160 can record data such as image information and a sound signal to be processed by the digital image/sound processor 120.

The operation unit 180 is a generic name of an operation button and an operation dial provided to a casing of the digital camera 100, and receives a user's operation. For example, the release button 181, the zoom lever 182, the power button 183, the mode dial 184, the center button 185 and the cross button 186 shown in FIGS. 1, 2 and 3 correspond to the operation unit 180. When the operation unit 180 receives a user's operation, the operation unit 180 notifies the controller 130 of various operation instructing signals.

The mode dial 184 is a rotary dial. When the mode dial 184 is operated by the user, the controller 130 switches the operation mode of the digital camera 100 into an operation mode corresponding to the setting of the mode dial 184. The operation mode includes an auto-recording mode, a manual recording mode, a scene selection mode, a moving image recording mode, and a playback mode. The auto-recording mode, the manual recording mode and the scene selection mode are generally called as "a still image recording mode".

The release button 181 is a button which can be pressed in two ways with a half-pressing state and a full-pressing state. When the digital camera 100 is in the still image recording mode and the release button 181 is half-pressed down by the user, the controller 130 makes the AF (Auto Focus) control and the AE (Auto Exposure) control so as to determine a recording condition. In the AF control, the digital image/sound processor 120 calculates a contrast value of the image information in a predetermined region. The controller 130 drives the lens barrel 141 via the lens controller 142 based on the contrast value, and makes a feedback control so that the contrast value becomes maximum. As a result of the AF control, the controller 130 can obtain a focal distance up to the subject that is a target for the AF control. Further, as a result of the AF control, the lens barrel 141 can image a subject image as the target for the AF control on the CCD image sensor 143. Thereafter, when the release button 181 is fully pressed by the user, the controller 130 records the image information captured at full-press timing into the external storage medium 160.

The zoom lever 182 is a lever which can return to a center-position by it self and has a wide-angle end position and a telephoto end position relating to the view angle adjustment. When the zoom lever 182 is operated by the user, the zoom lever 182 sends the controller 130 an operation instructing signal for driving the lens barrel 141. That is to say, when the zoom lever 182 is operated to the wide-angle end position, the controller 130 drives the lens barrel 141 via the lens controller so that the subject is captured at wide angle. Similarly, when the zoom lever 182 is operated to the telephoto end, the controller 130 drives via the lens controller the lens barrel 141 so that the subject is captured in a telephoto state.

The power button 183 is a slide type button for turning ON/OFF of power supply to the respective elements in the digital camera 100. When the power button 183 is slid right by the user during the power OFF, the controller 130 supplies power to the respective elements composing the digital camera 100 to activate them. Further, when the power button 183 is slid left by the user during the power ON, the controller 130 stops the power supply to the respective elements.

The center button 185 is a button to be pressed. When the center button 185 is pressed down by the user with the digital camera 100 being in the recording mode or the playback mode, the controller 130 displays a menu screen on the display unit 190. The menu screen is a screen for setting various conditions for recording/playback. When being pressed down with one of setting items for the various conditions being selected, the center button 185 functions as a determination button.

The cross button 186 is a button which is to be pressed and is provided for up-down and right-left directions. By pressing down the cross button 186 on either one of four directions by the user, one of items for various conditions displayed on the display unit 190 can be selected.

The flashbulb 200 includes a xenon tube, a capacitor, a booster circuit and a light trigger circuit. The booster circuit applies a high voltage to the capacitor according to a control signal from the controller 130. The light trigger circuit causes the charged capacitor to discharge a high voltage according to a control signal from the controller 130 to allow xenon gas in the xenon tube to be instantaneously emit light. The light trigger circuit allows the capacitor to discharge the high-voltage in synchronization with the recording of image. As a result, the digital camera 100 can record a subject to which the light is emitted. That is to say, when the flashbulb 200 emits light instantaneously to the subject at the time of the recording of image, the recording can be carried out with the brightness of the subject compensated. The light emission of the flashbulb 200 includes pre-light emission and main light emission. The pre-light emission is a preliminary light emission before the recording of image for determining a distance to a subject based on a quantity of reflected light from the subject due to the emitted light to determine a light emitting amount of the flashbulb 200 at the time of the recording of image based on the determined result. The main light emission is light emission that is carried out in synchronization with a record timing with the light emitting amount determined in the pre-light emission.

1-2. Correspondence of Terms

The microphone 111 or a sound input terminal is one example of a sound input unit. The digital image/sound processor 120 is one example of a signal processor. The controller 130 is one example of a controller. The digital camera 100 is one example of a voice processing apparatus, an imaging apparatus and a sound pickup apparatus.

2. Operation

An operation of the digital camera 100 in the moving image recording mode according to the first embodiment will be described. The digital camera 100 displays a through image on the display unit 190 in a standby state in the moving image recording mode or a moving image recording state in which a moving image is being recorded. An operation of the moving image recording mode, a sound recording operation in the moving image recording, and an operation of the band-pass filter will be described below sequentially with reference to FIGS. 5 to 7B.

2-1. Operation in Moving Image Recording Mode

Figure 5:
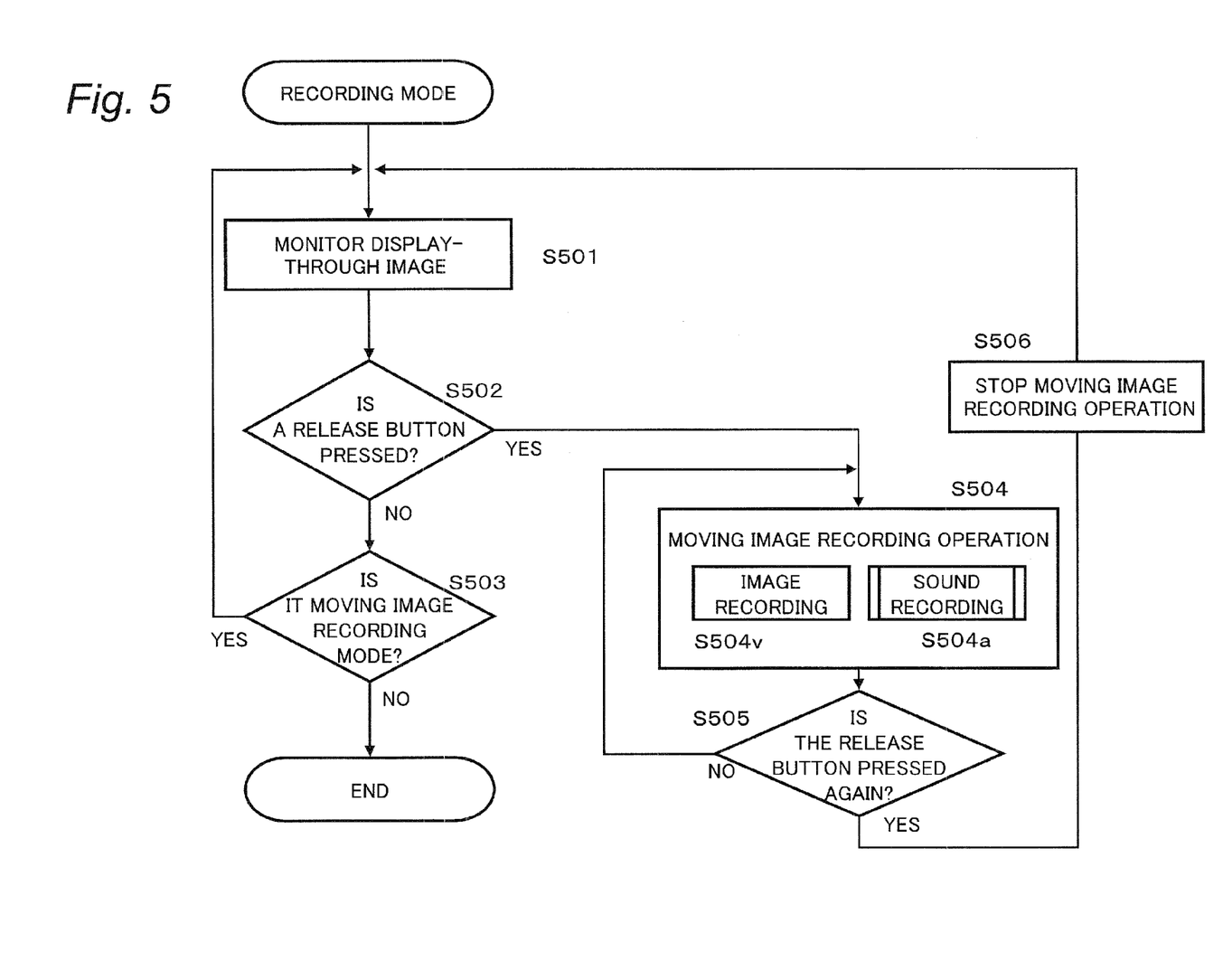
FIG. 5 is a flowchart illustrating an operation of a recording mode in the digital camera according to the first embodiment.

FIG. 5 is a flowchart illustrating an operation of the digital camera 100 in the moving image recording mode. When the mode dial 184 is set to the moving image recording mode by the user, the digital camera 100 enters the moving image recording mode.

The controller 130 displays a through image output from the digital image/sound processor 120 on the display unit 190 (S501). The state in step 5501 is the standby state in the moving image recording mode. The controller 130 determines whether the release button 181 is pressed down (S502).

When the controller 130 determines that the release button 181 is pressed down, the digital camera 100 proceeds to the moving image recording operation (S504). The moving image recording operation includes an image recording operation (S504v) and a sound recording operation (S504a). In the moving image recording operation, image information and the sound signal for one frame period, for example, are recorded. One frame period is obtained by an inverse number of a frame rate at the time of recording a moving image. For example, the frame rate is 60 frames/sec, one frame period is 1/60 second. The outline of the image recording operation in step S504v is as already described in the description of the "1. Configuration", and thus detailed description thereof is omitted. Details of the sound recording operation in step S504a are described later.

Thereafter, the controller 130 determines whether the release button 181 is again pressed down (S505). When the controller 130 determines in step S505 that the release button 181 is not again pressed down, the processing returns to step S504 to continue the moving image recording operation. On the other hand, when the determination is made that the release button 181 is again pressed down, the controller 130 stops the moving image recording operation (S506), and proceeds into the standby state (S501). In this manner, the digital camera 100 in the moving image recording mode performs the moving image recording operation after the release button 181 is first pressed down until the release button 181 is again pressed down.

On the other hand, when determining in step S502 that the release button is not pressed down, the controller 130 determines whether a current operation mode is the moving image recording mode (S503). When the determination is made that the current operation mode is the moving image recording mode, the processing returns to step S501 that is a starting point of the operation of the moving image recording mode. When the controller 130 determines in step S503 that the operation mode is not the moving image recording mode, namely, when a mode other than the moving image recording mode is set by the user's operation of the mode dial 184, the operation of the moving image recording mode is ended.

2.2 Sound Recording Operation

Figure 6:
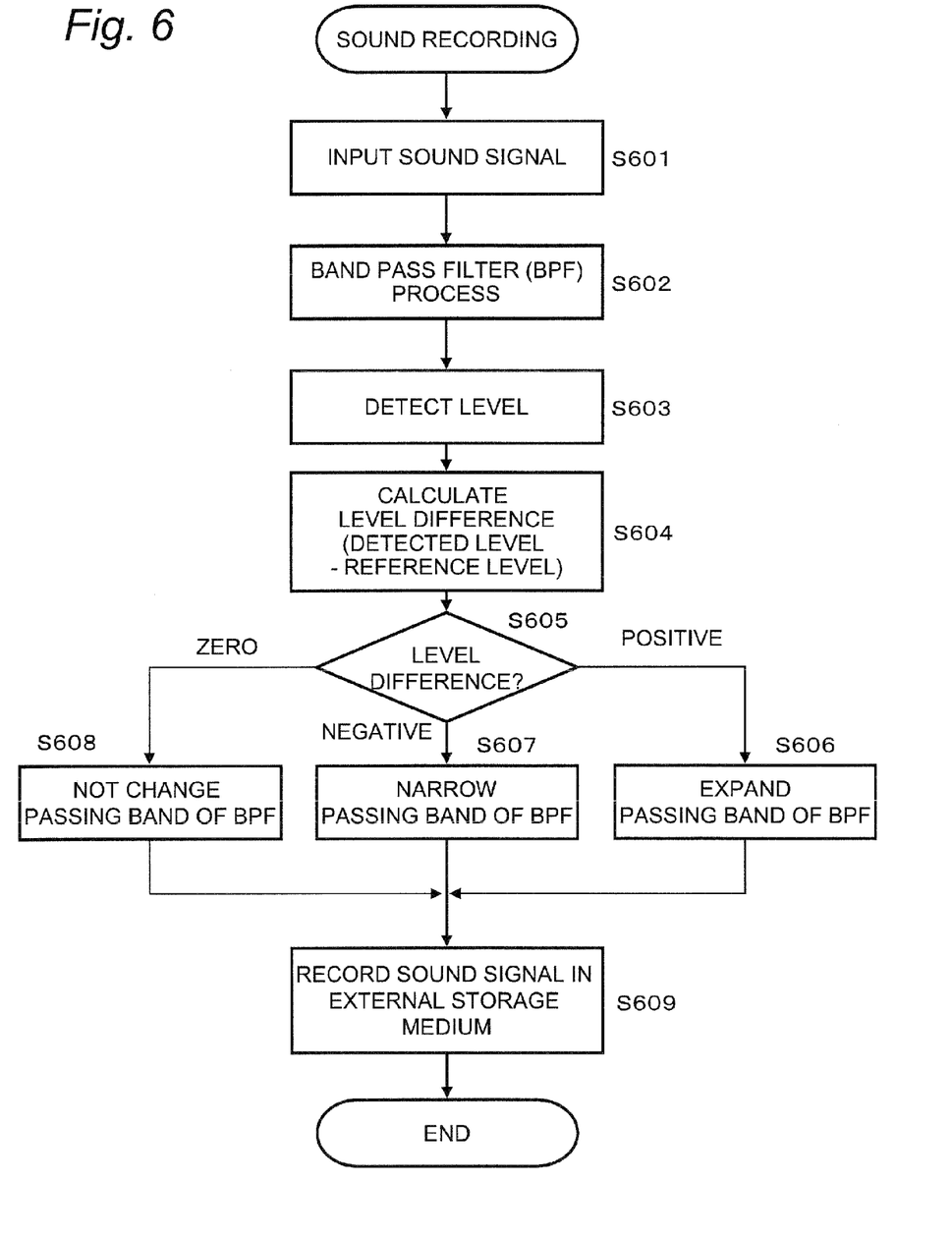
FIG. 6 is a flowchart illustrating a sound recording operation of the digital camera according to the first embodiment.

FIG. 6 is a flowchart illustrating the sound recording operation (step S504a) in a flowchart of FIG. 5. The sound recording operation will be concretely described below.

The analog sound processor 115 receives the sound signal output from the microphone 111, executes various analog signal processes, and then outputs the signal to the digital image/sound processor 120 (S601).

The digital image/sound processor 120 executes the band-pass filter (BPF) process having the passing band that is preset under the control of the controller 130 on the sound signal received from the analog sound processor 115 (S602). The sound signal subjected to the band-pass filter process is, then, recorded in the external storage medium (S609). A level of the sound signal subjected to the band-pass filter process is called as "a sound recording level".

After the band-pass filter process, the controller 130 detects the sound recording level of the sound signal output from the digital image/sound processor 120 (S603). The sound recording level can be set to a maximum level of the sound signal output from the digital image/sound processor 120 at a period (for example, 1 frame period) at which the sound signal in step S601 is input. Not the maximum level but an average level may be the sound recording level.

The controller 130 calculates a difference between the detected sound recording level and a reference level (S604). The reference level may be set to the sound recording level that is previous by a certain constant time (for example, before one frame period) or a level stored in advance in the ROM 170 at the time of starting the moving image recording.

The controller 130 determines a direction of a change in a sound level (increase, decrease, or no change) based on the calculated level difference (S605). Concretely, the controller 130 determines whether the calculated level difference is positive, negative, or zero (S605).

When the controller 130 determines that the calculated level difference is positive, namely, the sound recording level is increasing, the controller 130 controls the passing band of the band-pass filter process to be executed in step S602. Concretely, the controller 130 controls the digital image/sound processor 120 to set the passing band of the band-pass filter process to expand the passing band (S606). More concretely, the passing band is expanded by a predetermined width |D1|/2 (|D1| represents an absolute value of D1) on a high frequency side and a low frequency side from the currently set passing band. As a result, the passing band is totally expanded by |D1|.

When the controller 130 determines that the calculated level difference is negative, namely, the sound recording level is decreasing, the controller 130 controls the digital image/sound processor 120 to narrow the passing band of the band-pass filter. Concretely, the passing band is narrowed by a predetermined width |D2|/2 than the currently set passing band (|D2| represents an absolute value of D2) on the high frequency side and the low frequency side. As a result, the passing band is totally narrowed by |D2| (S607).

When determining that the calculated level difference is zero, namely, the sound recording level does not change, the controller 130 controls the digital image/sound processor 120 not to change the passing band of the band-pass filter process (S608).

The passing band changed in step S607 and S606 is reflected in the band-pass filter process for the sound signal at the next frame.

After steps S606, S607 and S608, the controller 130 records the sound signal in the external storage medium 160 (S609).

2-3. Band-Pass Filter Process

Figure 7A:
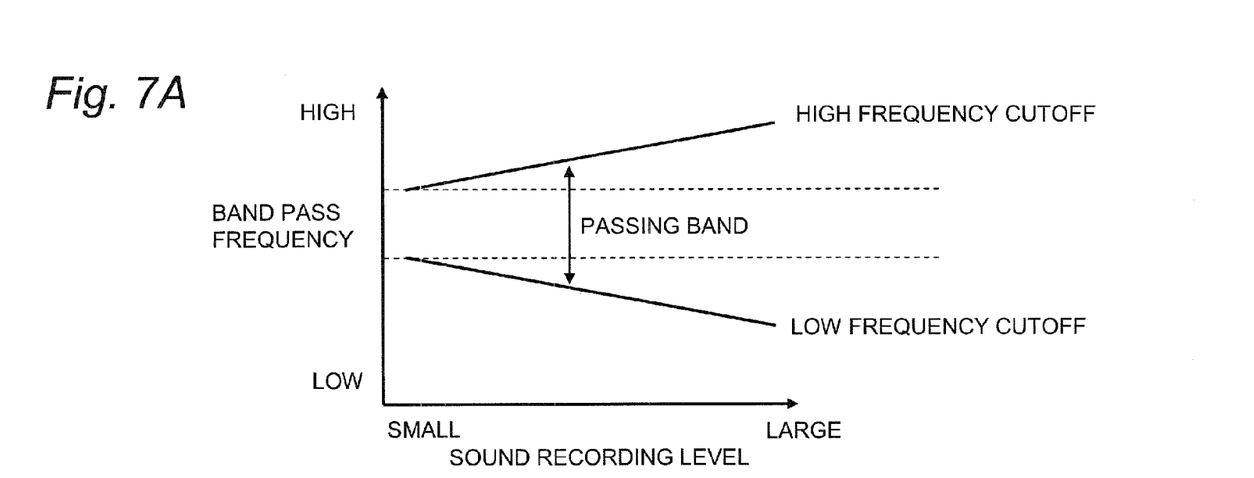
FIG. 7A is a diagram describing control of a band width of a passing band in a band-pass filter process according to the first embodiment.
Figure 7B:
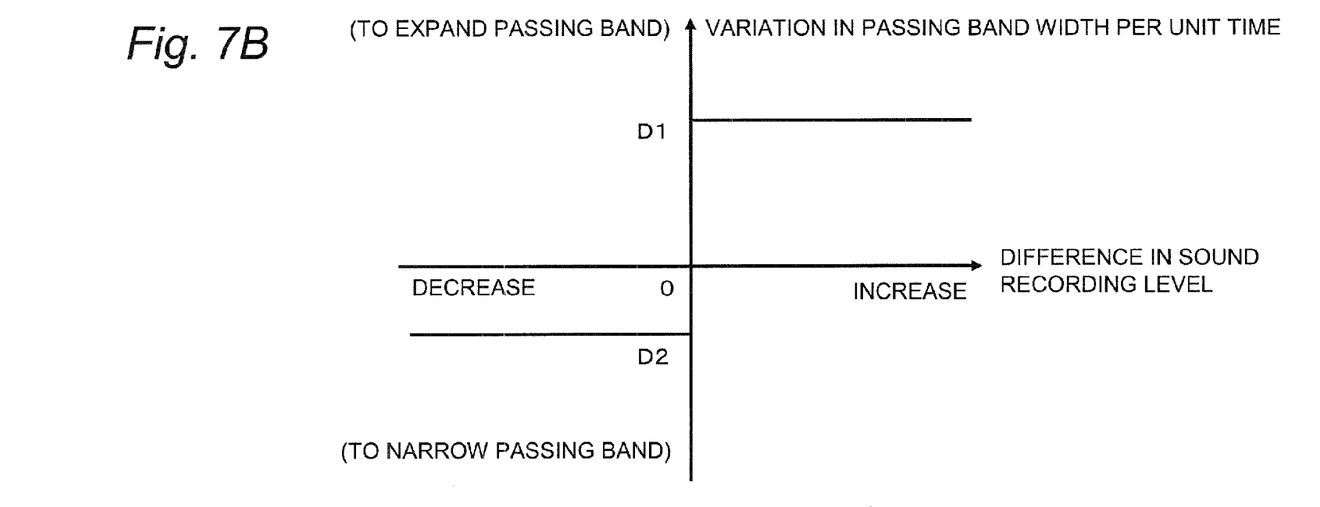
FIG. 7B is a diagram describing a variation of a band width of a passing band in the band-pass filter process according to the first embodiment.

FIGS. 7A and 7B are diagrams describing the control of the passing band in the band-pass filter process (step S602) described in the flowchart of FIG. 6. The control of the band in the band-pass filter process will be described below.

FIG. 7A is the diagram illustrating a relationship between the passing band of the band-pass filter (BPF) and the sound recording level. An abscissa axis shows the sound recording level, and an ordinate axis shows a band pass frequency of the band-pass filter. In the drawing, a sold line on an upper side represents a high frequency cutoff of the band-pass filter, and a solid line on a lower side represents a low frequency cut off of the band-pass filter. A region between the high frequency cutoff and the low frequency cutoff is the passing band at the respective sound recording levels. In the band-pass filter process according to this embodiment, as the sound recording level becomes lower, the low frequency cutoff of the band-pass filter becomes higher and the high frequency cutoff becomes lower so that the passing band of the band-pass filter becomes narrow.

FIG. 7B is the diagram illustrating a relationship between the level difference in the sound recording level and a variation of a band width of a passing band ("a passing band width") of the band-pass filter per unit time. An ordinate axis represents variation of the passing band width of the band-pass filter per unit time. An upper side on an origin of the ordinate axis is a positive region, and the variation in the positive region functions to broaden the passing band. A lower side on the origin of the ordinate axis is a negative region, and the variation in the negative region functions to narrow the passing band. An abscissa axis shows a level difference in the sound recording level. A right side on the origin of the abscissa axis is a positive region which is, a region where the sound recording level increases, and a left side on the origin of the abscissa axis is a negative region which is a region where the sound recording level decreases.

As described above, the controller 130 detects the sound recording level (S603), and calculates a change in the sound recording level as the level difference (S604). Thereafter, the controller 130 determines whether the level difference is positive, negative or zero (S605). When the level difference is positive, the controller 130 expands the passing band width of the band-pass filter (S606). The variation D1 of the passing band width of the band-pass filter per unit time at this time (for example, one frame period) is as follows:

$$D1 > 0 \tag{1}$$

According to the formula (1) and FIG. 7B, when the sound recording level increases, a variation of the passing band width of the band-pass filter is D1, which is positive. From this, it is understood that when the sound recording level increases, the passing band of the band-pass filter is widened.

On the other hand, when the level difference is negative, the controller 130 narrows the passing band width of the band-pass filter (S607). The variation D2 of the passing band width of the band-pass filter per unit time is expressed by the following formula:

$$D2 < 0 \tag{2}$$

According to the formula (2) and FIG. 7B, when the sound recording level decreases, the variation of the passing band width of the band-pass filter becomes D2, which is negative. From this, it is understood that when the sound recording level decreases, the passing band of the band-pass filter is narrowed.

The absolute values of D1 and D2 may be set so that a relationship in the following formula is established:

$$|D2| < |D1| \tag{3}$$

The formula (3) represents that the variation (absolute value) of the passing band width of the band-pass filter per unit time in the case where the band of the band-pass filter is expanded due increase of the sound recording level is larger than that in the case where the band of the band-pass filter is narrowed due to the decrease of the sound recording level. That is to say, the passing band of the band-pass filter may be controlled so that when the passing band is expanded, the passing band is changed more quickly, and when narrowed, the passing band is changed more slowly. A reason for controlling the speed of changing the passing band of the band-pass filter will be described below.

A characteristic of a human's audibility with respect to a small sound represents a convex-shaped frequency characteristic having a peak near 1 kHz to 2 kHz. That is to say, a frequency component in a middle frequency region near 1 kHz to 2 kHz is more important for a small sound than those in a high frequency region and a low frequency region. A hum noise that is distributed in the low frequency region and a hiss noise that is distributed in the high frequency region do not bother a user when ambient sound is big. However, if ambient sound is small, the hum noises are relatively big and thus bother the user. Therefore, when a sound level is low, the convex band-pass filter is used to allow the sound in the middle frequency region which include main components to pass, and reduce noises in the low and high frequency regions. When a sound level is high, the passing band of the band-pass filter is widened, so that the passing band of a sound signal is widely secured.

When the passing band of the band-pass filter is changed, a sense of discomfort in audibility should be avoided. For example, when a big sound is suddenly generated in a silent state and the passing band of the band-pass filter is slowly widened, a gentle change in the band can be heard by the user. For this reason, the user feels unnaturalness in audibility. On the contrary, when a big sound stops and the passing band of the band-pass filter is suddenly narrowed, the user feels that a sound distributed in a wide band region is like to be suddenly lost. For this reason, the user feels unnaturalness in audibility.

In this manner, according to the first embodiment, the speed of changing the passing band of the band-pass filter is made different between a case where the sound level changes in a direction of increasing and a case where the sound level changes in the direction of reducing. That is to say, when the sound level increases, the passing band of the band-pass filter is quickly widened, and when the sound level is reduced, the passing band of the band-pass filter is slowly narrowed. As a result, the sense of discomfort in audibility can be reduced.

3. Conclusion

The digital camera 100 according to the first embodiment includes the microphone ill for inputting a sound signal and the digital image/sound processor 120 that includes a band pass filter for limiting a passing band of the sound signal and executes a predetermined signal process on the sound signal output from the band-pass filter, and the controller 130 for controlling the passing band width of the band-limiting filter. The controller 130 changes the passing band width according to the level of the sound signal, and controls the speed at which the passing band width is expanded to be faster than the speed at which the passing band width is narrowed.

By changing the passing band of the band-pass filter according to a level of an input signal, the S/N ratio can be improved. Further when the sound level is changed from a small level to a large level, the passing band of the band-pass filter is expanded quickly, and when the sound level is changed from a large level to a small level, the passing band of the band-pass filter is slowly narrowed. By controlling the speed of changing the passing band as such, the user's sense of discomfort in audibility can be reduced.

In the digital camera 100 according to the first embodiment, the controller 130 sets the passing band of the band pass filter so that the passing band width is narrower as the level of the sound signal is lower.

As a result, the sense of discomfort in audibility is reduced while simultaneously improving the S/N ratio of the input sound signal.

Second Embodiment

The first embodiment controls the passing band in the band-pass filter process according to the flowchart in FIG. 6. The second embodiment describes another example of the control of the band in the band-pass filter process.

Figure 8:
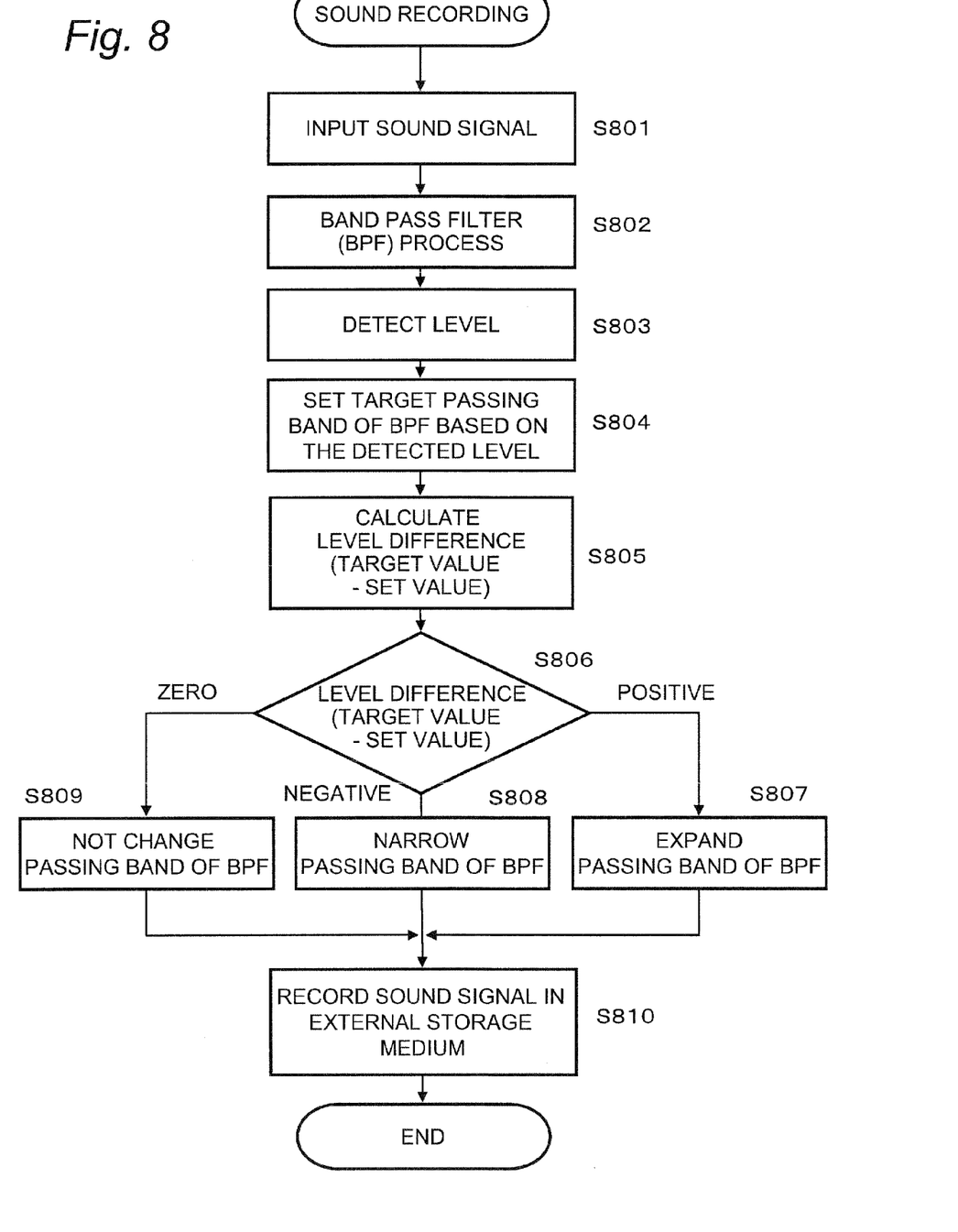
FIG. 8 is a flowchart illustrating the sound recording operation of the digital camera according to a second embodiment.

FIG. 8 is a flowchart illustrating the control of the passing band in the band-pass filter process according to the second embodiment.

The process in step S801 to S803 in a flowchart of FIG. 8 is the same as the process in step S601 to S603 in the flowchart of FIG. 6 according to the first embodiment. Therefore, detailed description of steps S801 to S803 will be omitted.

After the sound recording level is detected (S803), the controller 130 sets a target value of the passing band in the band-pass filter process based on the detected sound recording level (S804). Concretely, the high frequency cutoff and the low frequency cut-off according to the detected sound recording level are obtained based on the relationship of FIG. 7A.

The controller 130 detects a difference between the obtained target value of the passing band and the currently set passing band (S805). The controller 130 determines the change direction (increase, reduce, no change) of the passing band based on the calculated difference of the passing band (S806).

When it is determined that the target value of the passing band is wider than the currently set passing band (when the difference is positive), the controller 130 controls the digital image/sound processor 120 to expand the passing band of the band-pass filter process (S807). For example, the passing band is expanded on the high and low frequency region by a predetermined width |D1|/2, from the currently set passing band. As a result, the passing band is totally expanded by |D1|.

When it is determined that the target value of the passing band is narrower than the currently set passing band (the difference is negative), the controller 130 sets the passing band of the band-pass filter process to be narrower (S808). For example, the passing band is narrowed on the high and low frequency region by a predetermined width |D2|/2 from the currently set passing band. As a result, the passing band is totally narrowed by |D2|.

When it is determined that the target value of the passing band is the same as the currently set passing band (when the difference is zero), the controller 130 does not allow the passing band of the band-pass filter process to be changed (S809).

After the steps S807, S808 and S809, the controller 130 records the sound signal in the external storage medium 160 (S810).

Also in the second embodiment, similarly to the first embodiment, |D2| is set to be larger than |D1|. As a result, when the sound level increases, the passing band of the band-pass filter is quickly expanded, and when the sound level decreases, the band pass of the band-pass filter is slowly narrowed, thereby reducing the sense of discomfort in audibility.

Other Embodiments

Embodiments are not limited to the above embodiments, and various embodiments can be considered. Other embodiments will be described below.

The above embodiments illustrate the digital camera 100 as a sound processing apparatus. However, any electronic devices that execute the similar process on sounds to be input may be used. That is to say, an apparatus that does not execute a process for images may be used, and for example, an electronic device such as a voice recorder may be used.

The above embodiments described the digital camera 100 as one example of the sound processing apparatus having the configuration which includes the microphone 111 as a sound input unit. However, the sound input unit may be any unit that can input a sound signal into the apparatus. For example, an input terminal for inputting a sound signal from an outside may be used, or a sound reproducing unit for reading a sound signal recorded in the external storage medium 160 may be used.

In the flowchart of FIG. 6, the detection of the level of the sound signal (S603) and the control of the passing band based on the level difference (S605 to S608) are conducted after the band-pass filter process (S602) for the input sound signal. However, these processes (S603, S605 to S608) may be executed before the band-pass filter process (S602).

The above embodiments described that the digital image/sound processor 120 and the controller 130 have the respective functions and configurations as described above. However a part of the function and configuration for one of the digital image/sound processor 120 and the controller 130 may be included in the other one of them.

The above embodiments described the CCD image sensor 143 as one example of the imaging unit, but the imaging unit is not limited to this. That is to say, another imaging element such as a CMOS image sensor or an NMOS image sensor can be utilized.

Figure 9A:
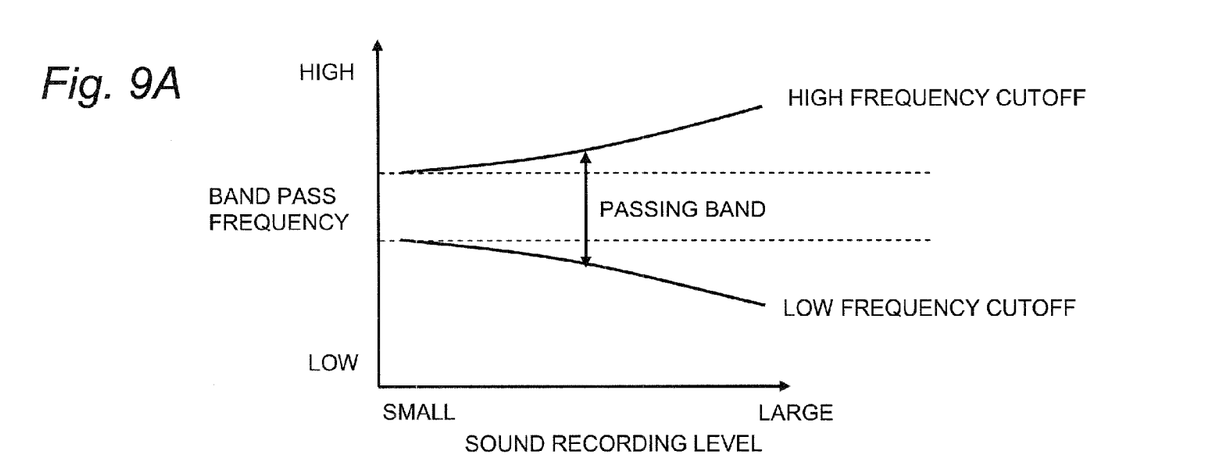
FIG. 9A is a diagram describing control of the band width of the passing band in the band-pass filter process according to the other embodiment.

The above embodiments described that the high frequency cutoff and the low frequency cut-off change linearly as shown in FIG. 7A according to the change in the sound recording level. However, the changes in the high frequency cut-off and the low frequency cut-off according to the change in the sound recording level are not limited to this. For example, as shown in FIG. 9A, the high frequency cutoff and the low frequency cutoff may change in a curve according to the change in the sound recording level. That is to say, it is enough that the passing band is changed so that as the sound recording level increases, the passing band becomes wide.

Figure 9B:
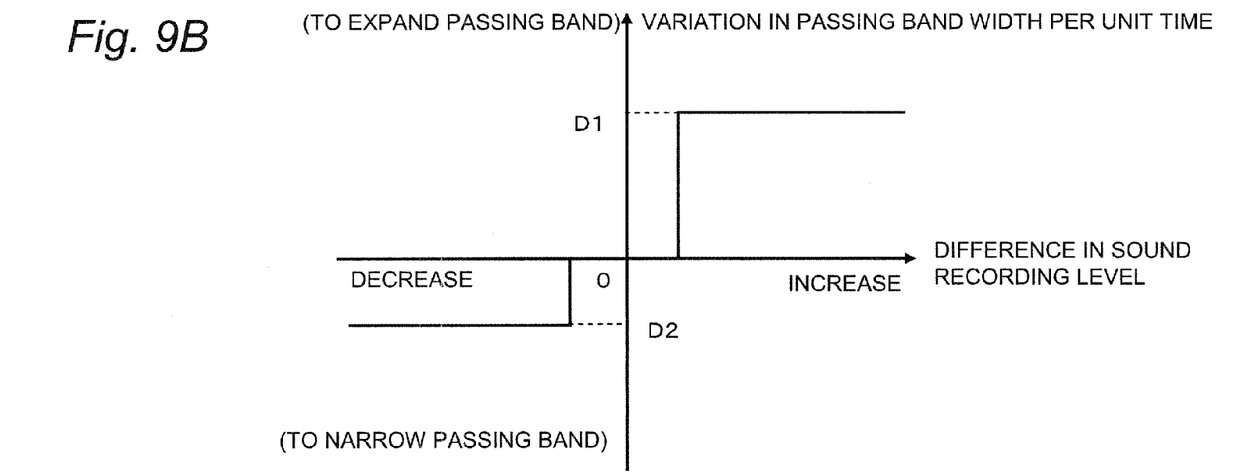
FIG. 9B is a diagram describing a variation of the band width of the passing band in the band-pass filter process according to the other embodiment.

The above embodiments described that the relationship between the variation in the passing band width per unit time and the level difference of the sound recording level is as shown in FIG. 7B. However the relationship is not limited to this. For example, the relationship may be as shown in FIG. 9B. That is to say, when the absolute value of the level difference in the sound recording level is not more than a predetermined threshold, the passing band may not be changed. As a result, the variation of passing band width is prevented from being frequently changed.

The above embodiments described the digital camera as one example of the imaging apparatus, but the imaging apparatus is not limited to the digital camera. The technical ideas described in the above embodiments for reducing the user's sense of discomfort in audibility and for simultaneously improving the S/N ratio of an input sound signal to be input can be applied to any apparatus, such as a movie camera and a mobile phone with a camera, that can record a sound as well as an image.

It goes without saying that the technical ideas described in the above embodiments for reducing the user's sense of discomfort in audibility and for simultaneously improving the S/N ratio of an input sound signal can be applied to an apparatus (a sound pickup apparatus) for recording only a sound signal without an image recording function, such as a voice recorder, and an apparatus for executing a predetermined process on an input sound signal.

INDUSTRIAL APPLICABILITY

The embodiments can provide a sound processing apparatus that can reduce the user's sense of discomfort in audibility and can simultaneously improve the S/N ratio of an input sound signal. The idea of the embodiments can be applied to devices that can record sound information, such as a digital camera, a movie camera, a mobile phone and a voice recorder, and a sound processing apparatus to be used in such devices.

What is claimed is:

1. A sound processing apparatus, comprising:
   a sound input unit configured to input a sound signal;
   a signal processor having a band-limiting filter operable to limit a passing band of the sound signal input by the sound input unit, the signal processor being configured to apply a predetermined signal processing on a sound signal output from the band-limiting filter; and
   a controller configured to control a band width of the passing band of the band-limiting filter,
   wherein the controller changes the band width of the passing band of the band-limiting filter according to a level of the sound signal input by the sound input unit, makes a speed of changing the band width faster when expanding the band width than when narrowing the band width, and the controller sets the passing band of the band-limiting filter so that as the level of the sound signal is lower, the band width of the passing band is narrower.

2. A sound pickup apparatus, comprising:
   a sound input unit configured to obtain a sound and generate a sound signal based on the obtained sound;
   a signal processor having a band-limiting filter operable to limit a passing band of the sound signal generated by the sound input unit, the signal processor being configured to apply a predetermined signal processing on a sound signal output from the band-limiting filter; and
   a controller configured to control a band width of the passing band of the band-limiting filter,
   wherein the controller changes the band width of the passing band of the band-limiting filter according to a level of the sound signal generated by the sound input unit, makes a speed of changing the band width faster when expanding the band width than when narrowing the band width, and the controller sets the passing band of the band-limiting filter so that as the level of the sound signal is lower, the band width of the passing band is narrower.

3. An imaging apparatus capable of recording a subject image as image data, comprising:
   a sound input unit configured to input a sound signal;
   a signal processor having a band-limiting filter operable to limit a passing band of the sound signal input by the sound input unit, the signal processor being configured to apply a predetermined signal processing on a sound signal output from the band-limiting filter; and
   a controller configured to control a band width of the passing band of the band-limiting filter,
   wherein the controller changes the band width of the passing band of the band-limiting filter according to a level of the sound signal input by the sound input unit, and makes a speed of changing the band width faster when expanding the band width than when narrowing the band width, and the controller sets the passing band of the band-limiting filter so that as the level of the sound signal is lower, the band width of the passing band is narrower.

4. The sound processing apparatus according to claim 1, wherein the passing band of the band-limiting filter is defined by a low frequency cutoff and a high frequency cutoff.

5. The sound pickup apparatus according to claim 2, wherein the passing band of the band-limiting filter is defined by a low frequency cutoff and a high frequency cutoff.

6. The imaging apparatus according to claim 3, wherein the passing band of the band-limiting filter is defined by a low frequency cutoff and a high frequency cutoff.

* * * * *